United States Patent
Okumura

(10) Patent No.: US 9,013,791 B2
(45) Date of Patent: Apr. 21, 2015

(54) SCREEN

(75) Inventor: Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/347,090

(22) PCT Filed: Jul. 10, 2012

(86) PCT No.: PCT/JP2012/067589
§ 371 (c)(1),
(2), (4) Date: Mar. 25, 2014

(87) PCT Pub. No.: WO2013/046858
PCT Pub. Date: Apr. 4, 2013

(65) Prior Publication Data
US 2014/0240825 A1    Aug. 28, 2014

(30) Foreign Application Priority Data
Sep. 27, 2011 (JP) .................................. 2011-211587

(51) Int. Cl.
*G03B 21/62* (2014.01)
*G03B 21/625* (2014.01)
*G02B 3/08* (2006.01)
*G02B 5/02* (2006.01)

(52) U.S. Cl.
CPC ............. *G03B 21/625* (2013.01); *G03B 21/62* (2013.01); *G02B 3/08* (2013.01); *G02B 5/0242* (2013.01); *G02B 5/0278* (2013.01)

(58) Field of Classification Search
CPC ............................. G03B 21/62; G03B 21/625

USPC ................................. 359/455–456, 459–460
See application file for complete search history.

(56) References Cited

U.S. PATENT DOCUMENTS

| 7,253,955 B2* | 8/2007 | Watanabe et al. ............. 359/459 |
| 8,213,082 B2* | 7/2012 | Gaides et al. ................. 359/452 |
| 2004/0141234 A1 | 7/2004 | Sakaguchi |
| 2010/0188745 A1 | 7/2010 | Endo et al. |

FOREIGN PATENT DOCUMENTS

| EP | 1 403 696 A1 | 3/2004 |
| JP | 2000-305179 A | 11/2000 |
| JP | 2004-117574 A | 4/2004 |
| JP | 2006-284985 A | 10/2006 |

(Continued)

OTHER PUBLICATIONS

Machine translation of 2006-284985 Oct. 2006.*

(Continued)

*Primary Examiner* — Christopher Mahoney
(74) *Attorney, Agent, or Firm* — Wilmer Cutler Pickering Hale and Dorr LLP

(57) ABSTRACT

The invention realizes a screen in which the luminous intensity of scattered light emitted from the screen is made more uniform. The screen diffuses incident light that is irradiated from an incident surface and emits light from an emission surface that is opposite the incident surface. The screen is provided with: a first light-diffusing area (402) formed on the incident-surface side and provided with a mirror (403) that reflects a portion of the incident light (404), and a second light-diffusing area (401) formed on the emission-surface side and that scatters incident light that includes the light reflected from the mirror.

15 Claims, 6 Drawing Sheets

(a)

(b)

(56) References Cited

FOREIGN PATENT DOCUMENTS

| JP | 2007-279205 A | 10/2007 |
| JP | 2008-083687 A | 4/2008 |
| JP | 4401681 B | 11/2009 |
| JP | 2010-061112 A | 3/2010 |
| JP | 2010-145770 A | 7/2010 |
| JP | 2010-197565 A | 9/2010 |

OTHER PUBLICATIONS

International Search Report corresponding to PCT/JP2012/067589 dated Oct. 16, 2012 (2 pages).

* cited by examiner

SCREEN

CROSS-REFERENCE TO RELATED APPLICATIONS

This application is a national stage application of International Application No. PCT/JP2012/067589 entitled "Screen," filed on Jul. 10, 2012, which claims the benefit of the priority of Japanese patent application No. 2011-211587, filed on Sep. 27, 2011, the disclosures of each of which are hereby incorporated by reference in their entirety.

TECHNICAL FIELD

The present invention relates to a screen that diffuses and emits irradiated light.

BACKGROUND ART

Screens that are used in rear-projection TVs are required to have the capabilities of improving viewing angle as well as diffusing and emitting incident light to raise the uniformity of the luminance (intensity) of emitted light. Recent years have seen the frequent use of video light realized by lasers that has high picture quality due to such characteristics as fixed wavelength and the ability to efficiently obtain linearly polarized light. The above-described diffusion capability is of particular importance because video light realized by laser has a high degree of straightness.

For example, FIG. 1 shows the configuration of a light-diffusing screen directed toward achieving uniformity of the luminance of emitted light that is disclosed in Patent Document 1 (Japanese Unexamined Patent Application Publication No. 2008-83687).

Screen 10 is made up by lenticular lens 11 and Fresnel lens 12. Light that is emitted from light source 70 is projected by way of projection lens 80, and this light is irradiated as incident light into Fresnel lens 12 that diffuses the incident light. The incident light that is irradiated into Fresnel lens 12 becomes scattered waves in which phase is shifted and scattered by the light-diffusing material in Fresnel lens 12, is emitted from Fresnel lens 12, and is irradiated into lenticular lens 11. The light that is irradiated into lenticular lens 11 is particularly distributed in a horizontal direction, whereby the emitted light (scattered waves) undergoes self-interference to produce uniform luminance.

The screen disclosed in Patent Document 1 employs a Fresnel lens provided with a diffusion characteristic and a lenticular lens that places light that is incident to the Fresnel lens in a uniform state. To further simplify the configuration, the same effect can be obtained by forming a lens array on the incident side.

In addition, in order to achieve a superior light diffusion characteristic and produce more emitted light than reflected light, a light-diffusing screen is proposed in which light-diffusing particles having two types of particle sizes are dispersed in a binder, and such a construction is disclosed in, for example, Patent Document 2 (Japanese Patent No. 4401681).

FIG. 2 shows the light diffusion characteristic of the light-diffusing screen disclosed in Patent Document 2.

FIG. 2(a) shows the light diffusion characteristic when incident light 202, that is generated by, for example, a lamp, is irradiated, and FIG. 2(b) shows the light diffusion characteristic when laser beam 205 is irradiated.

As shown in FIG. 2(a), the greater portion of incident light 202 that is irradiated into the light-diffusing screen becomes emitted light 203 that is scattered, and a portion becomes rear-surface reflected light 204. In FIG. 2, the length of the arrows of emitted light 203 and rear-surface reflected light 204 indicates the intensity of the light that is scattered in each direction. When light-diffusing particles are simply dispersed, the proportions of the emitted light and the rear-surface reflected light have substantially the same level, but dispersing light-diffusing particles having two types of particle size produces more emitted light 203 than rear-surface reflected light 204.

When laser beam 205 is irradiated, emitted light 206 becomes more abundant than rear-surface reflected light 207, as shown in FIG. 2(b).

FIG. 3 is a view for describing in greater detail the light diffusion characteristic when a laser beam is irradiated into a light-diffusing screen such as is disclosed in Patent Document 2.

As shown in FIG. 3(a), laser light from laser 301 is irradiated with angles of incidence of 0 degrees, 20 degrees, and 40 degrees into light-diffusing screen 302 having a viewing angle of 140 degrees, and the light intensity is then measured by brightness photometer 303 for the emitted light of each case. Brightness photometer 303 was moved in a circular arc over a range of from −70 degrees to 70 degrees in 5-degree increments.

FIG. 3(b) shows the results of the above-described measurement. Based on the high level of straightness of the laser beam, the intensity of scattered light is high in the direction along the direction in which the laser beam advances.

Patent Document 3 (Japanese Unexamined Patent Application Publication No. 2010-145770) discloses a screen that, as a configuration for achieving a superior viewing angle characteristic and for providing wavelength selectivity to improve contrast, is provided with a layer in which micro-pieces having wavelength selectivity are dispersed and that scatters transmitted light.

LITERATURE OF THE PRIOR ART

Patent Documents

Patent Document 1: Japanese Unexamined Patent Application Publication No. 2008-083687
Patent Document 2: Japanese Patent No. 4401681
Patent Document 3: Japanese Unexamined Patent Application Publication No. 2010-145770

SUMMARY OF THE INVENTION

Problem to be Solved by the Invention

Of the above-described light-diffusing screens, in screens that employ regularly arranged lenses such as disclosed in Patent Document 1, this regularity heightens the intensity of scattered light of a specific direction, and the performance with respect to viewing angle is consequently inadequate.

In the light-diffusing screen disclosed in Patent Document 2 as well, the use of a laser beam heaving a high level of straightness results in high intensity of scattered light along the direction in which the laser beam advances, and the performance with regard to viewing angle is therefore inadequate.

In the screen described in Patent Document 3, micro-pieces having wavelength selectivity are dispersed. The reflected light intensity and transmitted light intensity of elements provided with wavelength selectivity typically are dependent on the angle of incidence. As a result, when micro-pieces are simply dispersed, the angle of incidence to the micro-pieces is not fixed, and the intensity of the transmitted light and the subsequent scattered light are also not fixed, resulting in the occurrence of irregularities in color and the consequent difficulty of obtaining a uniform image.

It is an object of the present invention to realize a screen that can increase the uniformity of luminous intensity for scattered light that is emitted from the screen.

Means for Solving the Problem

The screen according to the present invention is a screen that diffuses incident light that is irradiated from an incident surface and that emits the light from an emission surface that is opposite the incident surface, and includes a light-diffusing capability provided with:

a first light-diffusing area that is formed on the incident-surface side and that is provided with a mirror that reflects a portion of incident light; and a second light-diffusing area that is formed on the emission-surface side and that scatters incident light including light reflected by the mirror.

In the present invention that is configured as described above, a further improvement of the light-diffusing effect is obtained.

BEST MODE FOR CARRYING OUT THE INVENTION

Exemplary embodiments of the present invention are next described with reference to the accompanying drawings.

Figure 4:
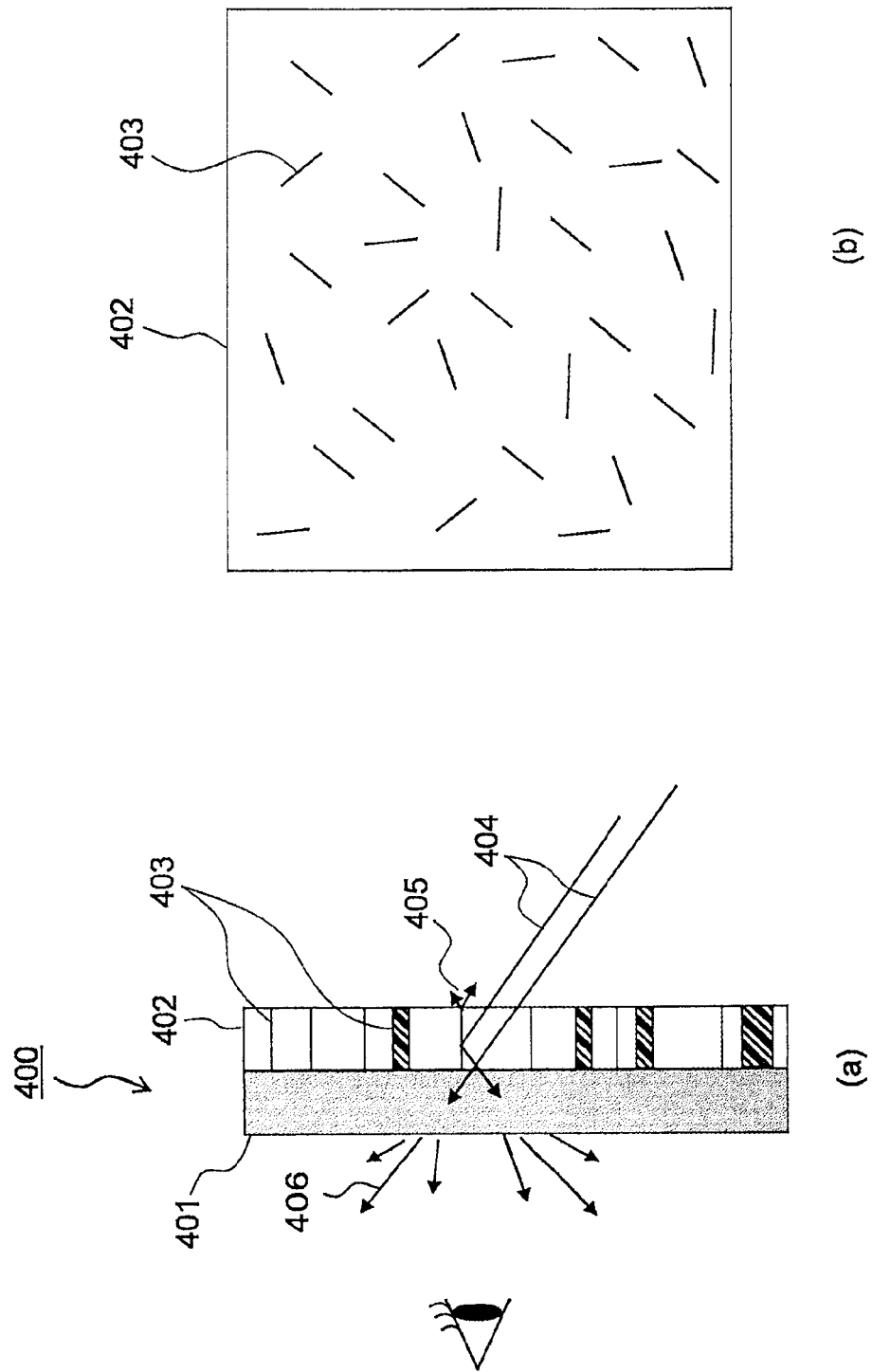
FIG. 4 shows the configuration of an exemplary embodiment according to the present invention, (a) showing a sectional view, and (b) showing a plan view.

FIG. 4 shows the configuration of screen 400 that is an exemplary embodiment according to the present invention. As shown in the sectional view of FIG. 4(a), this exemplary embodiment is made up of light-diffusing screen 401 and transparent body 402.

Figure 1:
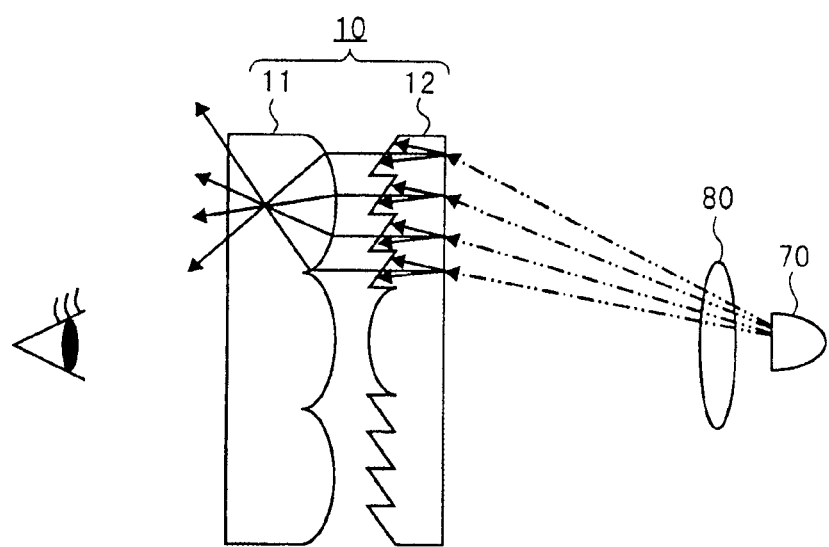
FIG. 1 shows the configuration of the light-diffusing screen that is disclosed in Patent Document 1.
Figure 2:
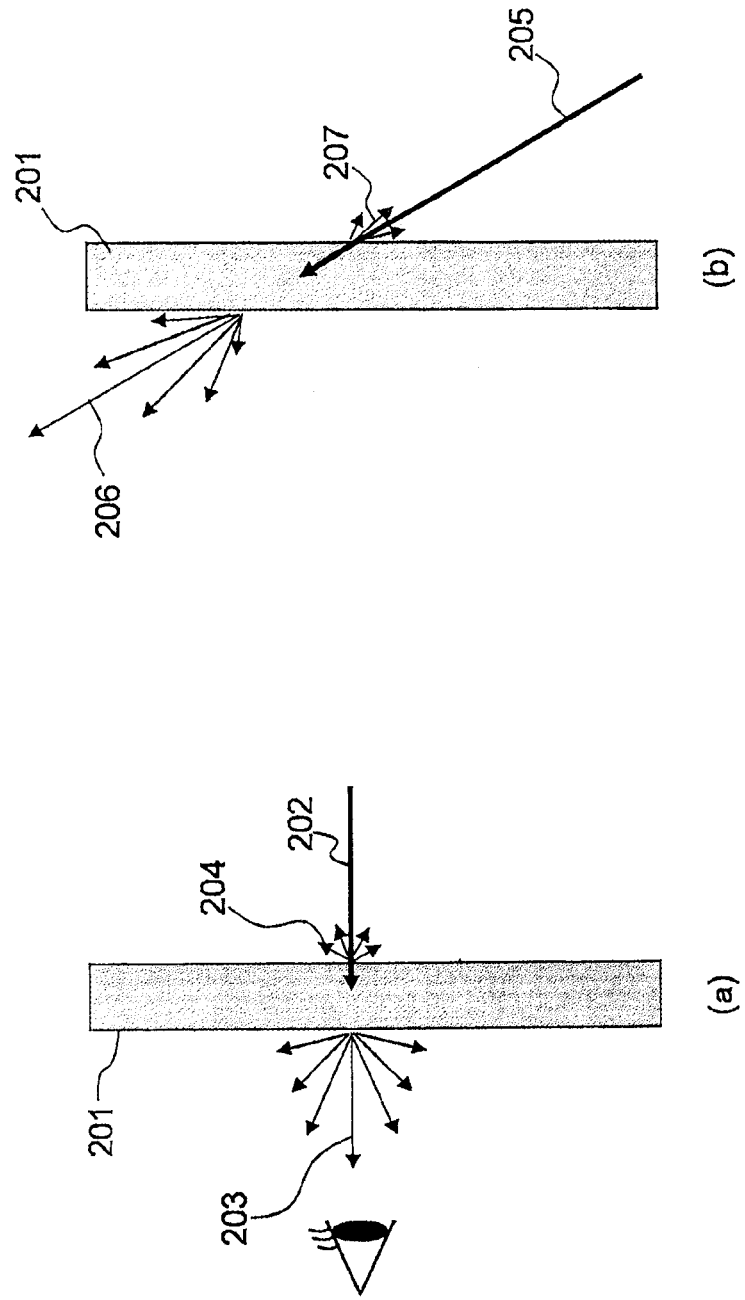
FIG. 2 shows the light diffusion characteristic of the light-diffusing screen that is disclosed in Patent Document 2, (a) showing the light diffusion characteristic when incident light is irradiated that is produced by, for example, a lamp, and (b) showing the light diffusion characteristic when a laser beam is irradiated.
Figure 3:
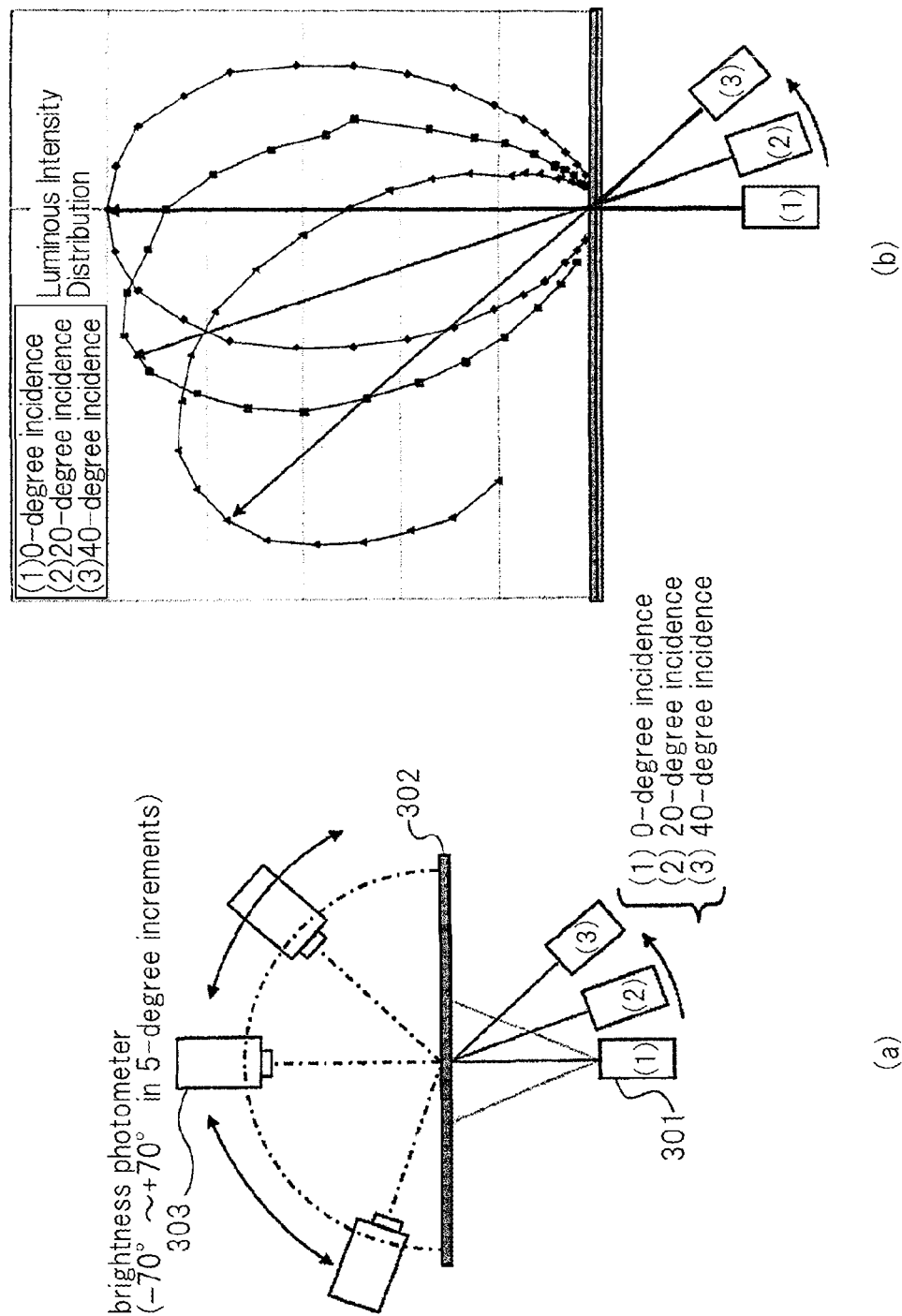
FIGS. 3(a) and (b) are views for describing in greater detail the light diffusion characteristic when a laser beam is irradiated into the light-diffusing screen that is disclosed in Patent Document 2.

Light-diffusing screen 401 is a component such as shown in FIG. 1 or FIG. 2 in which light-diffusing particles having two types of particle sizes are dispersed in a binder, and thus has the function of diffusing light that is irradiated from one surface and emitting light from the other surface. Transparent body 402 is composed of a transparent material such as resin, and planar-shaped micromirrors 403 are embedded in the transparent material.

FIG. 4(b) is a plan view of transparent body 402 as seen from the incident side, and as shown in FIGS. 4(a) and (b), micromirrors 403 are irregularly embedded within transparent body 402 such that their reflecting surfaces are perpendicular to incident surface and their reflection directions are random.

In FIG. 4(a), incident light 404 that is irradiated into transparent body 402 is shown as having a beam radius to conform to the actual state. A portion of incident light 404 is reflected by micromirrors 403 and therefore is irradiated into light-diffusing screen 401 in a first direction that differs from the direction of incidence, and a portion is irradiated without being reflected by micromirrors 403 and is therefore irradiated in a second direction that is the same as the direction of incidence to transparent body 402. As a result, emitted light 406 from light-diffusing screen 401 is light that has been scattered from light directed in the first direction and second direction, and because this light is more widely scattered, the luminous intensity has been rendered more uniform.

The proportion of diffused light that is produced by micromirrors 403 is determined by factors such as the size of micromirrors 403, the thickness of transparent body 402, and the angle of incidence and the beam radius of incident light 404; and the proportion of diffused light can therefore be adjusted by appropriate modifications according to the state of the optical system of a device that uses screen 400.

In the present exemplary embodiment, reflected light 405 is generated from the end surfaces of micromirrors 403 in addition to the rear-surface reflection from light-diffusing screen 401. However, because micromirrors 403 are formed extremely thin, the amount of generated light is limited and has little influence upon the total amount of generated light.

Figure 5:
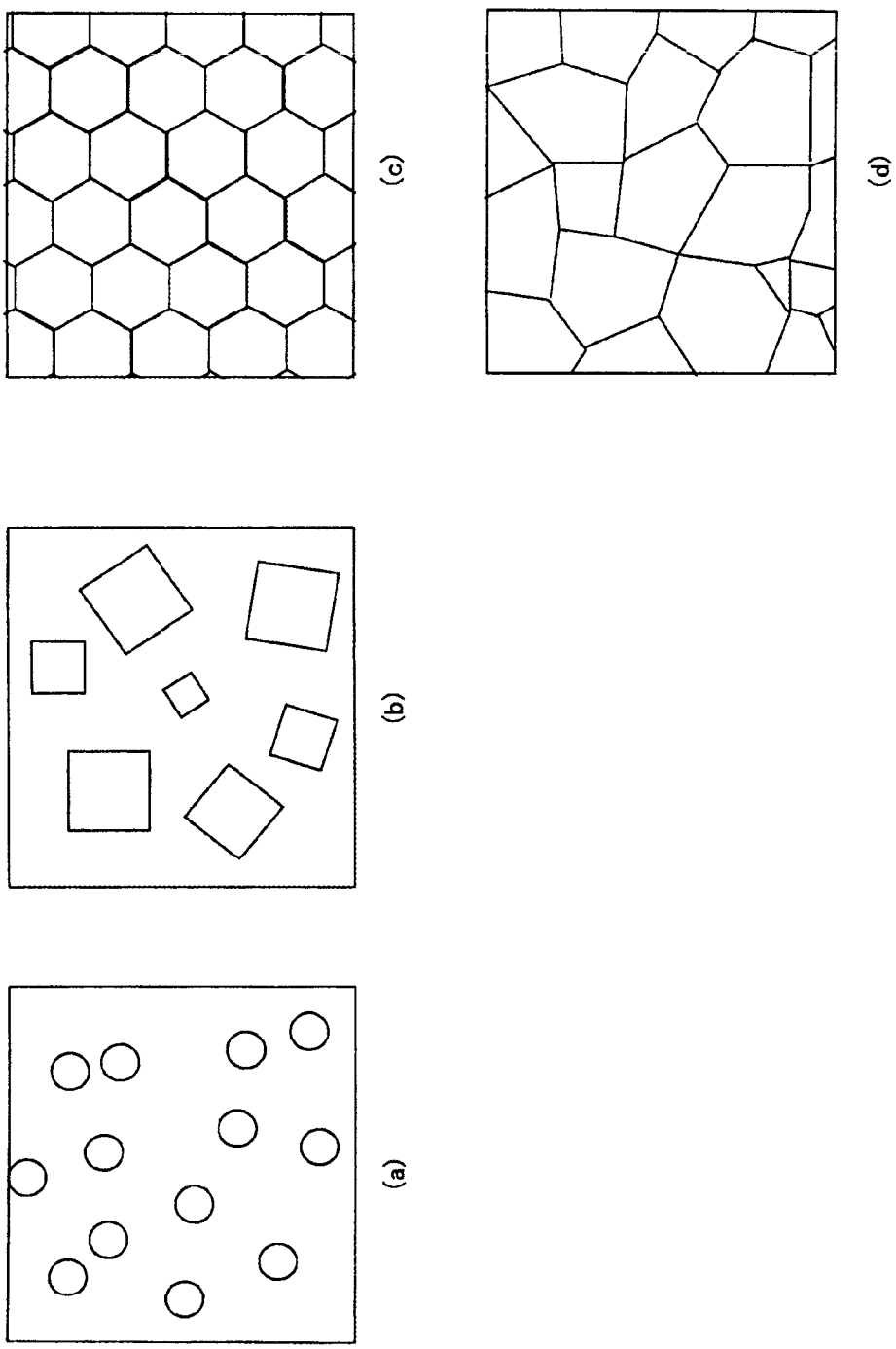
FIG. 5(a)-(d) each show examples of modifications of micromirror 403 shown in FIG. 4.

FIG. 5 shows examples of modifications of micromirrors 403 shown in FIG. 4.

Micromirrors are shown as cylindrical shapes in FIG. 5(a), as rectangular columns in FIG. 5(b), as a continuum of regular honeycomb shapes in FIG. 5(c), and as a continuum of irregular shapes in FIG. 5(d). The cylindrical shapes, rectangular column shapes, and honeycomb shapes described here refer to the shapes formed by mirrors. The reflection surfaces of the mirrors may be formed on a portion of the surfaces of the mirrors or may be formed over the entire surface of the mirrors.

Regarding the columnar shapes shown in FIGS. 5(a) and (b), the interior and exterior transparent body may be made of different substances, and may, for example, be of a hollow structure. In addition, regarding the dimensions of micromirrors, there is no need for micromirrors to be of the same size as shown in FIG. 4(b), and the size of each micromirror may differ. The above described overall construction is acceptable provided that the density and irregularity, that obtain uniform diffusion with respect to the light-diffusing screen, are maintained.

In the case of the continuums shown in FIGS. 5(c) and (d), a hollow construction lacking a transparent body such as resin is acceptable if the support construction has adequate strength. When the honeycomb structure shown in FIG. 5(c) is adopted, fabrication itself is easy but the structure entails the risk of causing interference fringes due to the regularity of the structure. As a result, shapes having irregularity, such as shown in FIG. 5(d), are preferable.

The above-described continuums may be of a structure in which adjacent mirrors are in contact with each other.

Figure 6:
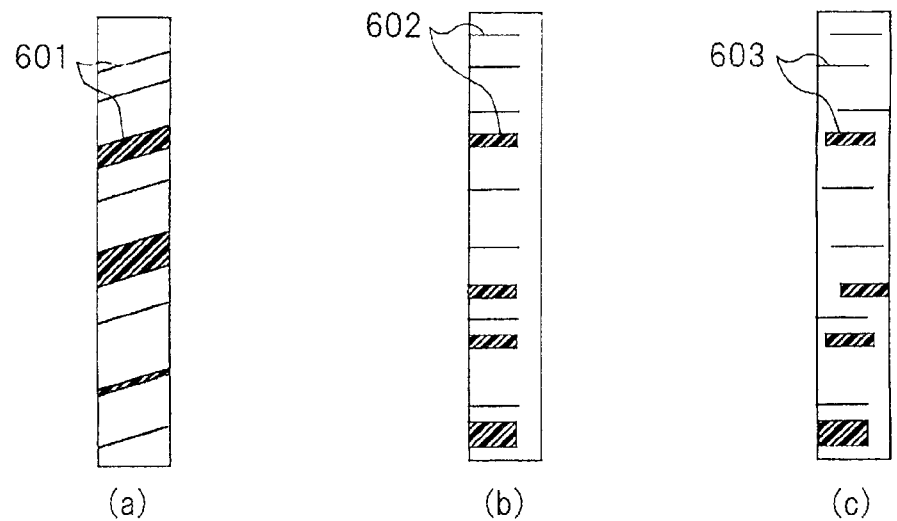
FIG. 6(a)-(c) each show examples of modifications of the arrangement of micromirrors.

FIG. 4 shows an example in which micromirrors 403 are embedded in the interior over the entire direction of thickness of transparent body 402 such that their reflection surfaces are perpendicular to the incident surface, but the present invention is not limited to this form. FIG. 6 shows examples of modifications of the arrangement of micromirrors.

Micromirrors 601 shown in FIG. 6(a) are provided such that their reflection surfaces are inclined, and not perpendicular, to the incident surface. The angle of inclination with respect to the incident surface is preferably from 45 degrees to 135 degrees, from 60 degrees to 120 degrees being preferable. In addition, the reflection surfaces may also be substantially perpendicular to the incident surface. Micromirrors 602 shown in FIG. 6(b) are not formed over the entire direction of thickness of the transparent body, but are formed as far as a predetermined depth from one surface. Micromirrors 602 of this type of shape can be formed by using, for example, Nano-imprinting technology. Micromirrors 603 shown in FIG. 6(c) are made shorter than the thickness of the transparent body, and the position from the incident surface at which micromirrors are formed is not specifically fixed.

The shapes and formation positions of micromirrors have been described using FIG. 5 and FIG. 6, but these forms may be combined, and for example, the micromirrors of the various shapes shown in FIG. 5 can be provided inclined as shown in FIG. 6(a) or can be formed from one surface to a predetermined depth as shown in FIG. 6(b). In addition, a configuration is also possible in which the column-shaped micromirrors that are provided independently, as shown in FIGS. 5(a) and (b), are provided at various positions as shown in FIG. 6(c).

Figure 7:
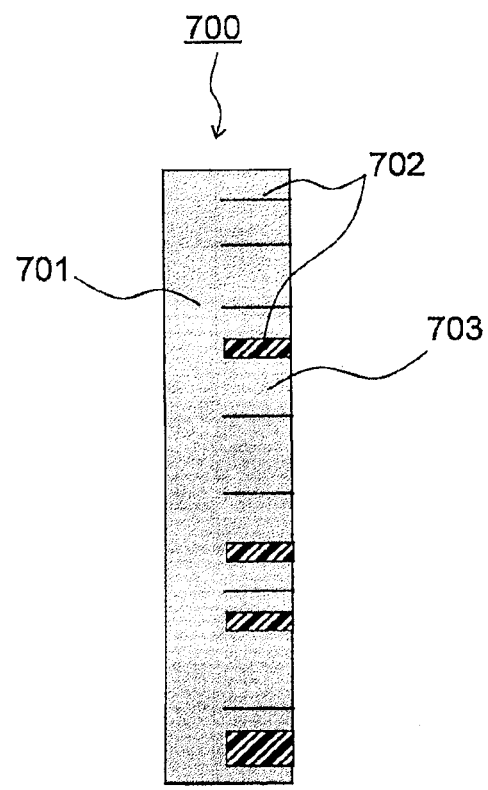
FIG. 7 is a sectional view showing the configuration of another exemplary embodiment according to the present invention.

FIG. 7 is a sectional view showing the configuration of screen 700, which is another exemplary embodiment according to the present invention.

This exemplary embodiment includes a construction in which micromirrors 702 are provided inside light-diffusing screen 701 in which light-diffusive particles that have two types of particle sizes are dispersed in binder such as shown in FIG. 2. Micromirrors 702 are formed irregularly as shown in FIG. 4(b) from the incident surface (the right side in the figure) to a fixed depth. In the present exemplary embodiment, incident light is diffused in region 703 (first light-diffusing area) in which micromirrors 702 are formed, and further diffused and emitted in the portion of the left side of the figure that is a second light-diffusing area.

In the present exemplary embodiment that is configured as described above, micromirrors 702 are formed directly in light-diffusing screen 701 without providing a transparent body as in the first exemplary embodiment, and as a result, reflection does not occur due to the difference in refractive index with a transparent body. In addition, diffusion is further improved because incident light is scattered in various directions before a portion is reflected by micromirrors 702.

In the exemplary embodiments shown in FIGS. 4 to 6, the same material as that of light-diffusing screen 701 may be used in place of a transparent body, as in the exemplary embodiment shown in FIG. 7.

Still further, in each of the above exemplary embodiments, light that has been diffused in advance by micromirrors on the emission side is irradiated into light-diffusing screen 701 that is provided on the emission side. As a result, a sufficient light-diffusing effect can be obtained even when using the Fresnel lens and lenticular lens shown in FIG. 1 in place of light-diffusing screen 701, and such a configuration may also be adopted.

In addition, the first light-diffusing area may be taken as the first layer and the second light-diffusing area may be taken as the second layer. The second layer may be laminated on the first layer.

A transparent body may further be arranged around mirrors.

Still further, the material that is arranged around mirrors of the first light-diffusing area may be the same as the material of the second light-diffusing area.

This application claims the benefits of priority based on Japanese Patent Application No. 2011-211587 for which application was submitted on Sep. 27, 2011 and incorporates by citation all of the disclosures of that application.

EXPLANATION OF REFERENCE NUMBERS 400, 700 screen
401, 701 light-diffusing screen
402 transparent body
403, 601, 602, 603, 702 micromirrors
404 incident light
405 reflected light
406 emitted light

What is claimed is:

1. A screen that diffuses incident light that is irradiated from an incident surface and that emits the light from an emission surface that is opposite the incident surface, comprising:
a first light-diffusing area that is formed on said incident-surface side and that is provided with a plurality of mirrors that reflects a portion of said incident light, each mirror of the plurality of mirrors having a reflection direction;
a second light-diffusing area that is formed on said emission-surface side and that scatters said incident light including light reflected by said plurality of mirrors,
wherein said plurality of mirrors are arranged such that their reflection directions are random.

2. The screen as set forth in claim 1, wherein:
the reflection surface of at least one mirror of said plurality of mirrors is inclined within a range of from 45 degrees to 135 degrees with respect to said incident surface.

3. The screen as set forth in claim 1, wherein:
light-diffusive particles having two types of particle sizes are dispersed in a binder in said second light-diffusing area.

4. The screen as set forth in claim 1, wherein:
said first light-diffusing area is a first layer, said second light-diffusing area is a second layer; and
said second layer is laminated on said first layer.

5. The screen as set forth in claim 1, wherein:
a transparent body is arranged around said plurality of mirrors.

6. The screen as set forth in claim 1, wherein:
material that is arranged around said plurality of mirrors of said first light-diffusing area and material of said second light-diffusing area are the same.

7. The screen as set forth in claim 1, wherein:
said second light-diffusing area is provided with a Fresnel lens and a lenticular lens.

8. The screen as set forth in claim 1, wherein:
at least one mirror of said plurality of mirrors is embedded in said first light-diffusing area.

9. The screen as set forth in claim 1, wherein:
the shape that is formed by at least one mirror of said plurality of mirrors is a column.

10. The screen as set forth in claim 1, wherein:
the shape that is formed by at least one mirror of said plurality of mirrors is a cylinder.

11. The screen as set forth in claim 1, wherein:
the shape that is formed by at least one mirror of said plurality of mirrors is a rectangular column.

12. The screen as set forth in claim 1, wherein:
at least two mirrors of said plurality of mirrors that are adjacent are interconnected.

13. The screen as set forth in claim 1, wherein:
said plurality of mirrors is arranged irregularly.

14. The screen as set forth in claim 1, wherein:
the reflection surface of at least one mirror of said plurality of mirrors is inclined within a range of from 60 degrees to 120 degrees with respect to said incident surface.

15. The screen as set forth in claim 1, wherein:
the reflection surface of at least one mirror of said plurality of mirrors is substantially perpendicular to said incident surface.

* * * * *